United States Patent [19]

Catterfeld et al.

[11] Patent Number: 4,893,986
[45] Date of Patent: Jan. 16, 1990

[54] HIGH-PRESSURE HIGH-TEMPERATURE COAL SLURRY CENTRIFUGAL PUMP AND LET-DOWN TURBINE

[75] Inventors: Fritz C. Catterfeld; George S. Wong, both of Los Angeles, Calif.

[73] Assignee: Rockwell International Corporation, El Segundo, Calif.

[21] Appl. No.: 783,045

[22] Filed: Sep. 30, 1985

Related U.S. Application Data

[63] Continuation of Ser. No. 88,884, Oct. 29, 1979, abandoned, which is a continuation-in-part of Ser. No. 33,085, Apr. 25, 1979, abandoned.

[51] Int. Cl.$^4$ .................... F03C 13/00; F04D 1/06; F04D 7/04
[52] U.S. Cl. .................... 415/100; 415/189; 415/196; 415/224.5
[58] Field of Search ............ 415/99, 100, 184, 189, 415/191, 205, 207, 219 A, 219 C, 203, 204, DIG. 3, 196, 224.5, 225, 226, 912

[56] References Cited

U.S. PATENT DOCUMENTS

| | | | |
|---|---|---|---|
| 773,953 | 11/1904 | Maginot | 415/184 |
| 1,125,763 | 1/1915 | Taylor et al. | 415/207 |
| 1,269,063 | 6/1918 | DeLaval | 415/183 X |
| 1,408,291 | 2/1922 | Haentjens | 415/100 X |
| 1,727,703 | 9/1929 | Hause et al. | 415/196 X |
| 1,768,242 | 6/1930 | Ferguson | 415/DIG. 3 |
| 2,112,651 | 3/1938 | Fox | 415/100 X |
| 2,280,585 | 4/1942 | Kapitza | 415/DIG. 3 |
| 2,407,987 | 9/1946 | Landberg | 415/100 X |
| 2,671,406 | 3/1954 | Waller | 415/205 |
| 2,976,810 | 3/1961 | Evans et al. | 415/99 X |
| 3,005,618 | 10/1961 | Buchi | 415/184 |
| 3,128,713 | 4/1964 | Nechine | 415/205 X |
| 3,362,629 | 1/1968 | Papapanu | 415/207 X |
| 3,489,340 | 1/1970 | Holzhausen | 415/207 X |
| 4,076,450 | 2/1978 | Ross | 415/197 |
| 4,181,466 | 1/1980 | Owen | 415/207 X |

FOREIGN PATENT DOCUMENTS

| | | | |
|---|---|---|---|
| 704304 | 2/1965 | Canada | 415/DIG. 3 |
| 25391 | of 1905 | United Kingdom | 415/DIG. 3 |
| 333443 | 8/1930 | United Kingdom | 415/DIG. 3 |
| 897907 | 5/1962 | United Kingdom | 415/DIG. 3 |

*Primary Examiner*—Leonard E. Smith
*Attorney, Agent, or Firm*—H. Fredrick Hamann; Harry B. Field

[57] ABSTRACT

A two-stage, high-pressure centrifugal pump comprises a pump housing and at least one pair of external inlets and outlets for charging and discharging each stage of the pump. The inlets and outlets are located through the periphery of the pump for allowing on-line maintenance. Prerotator vanes are located along the interior wall of the pump housing and convey a fluid from the external inlet to the impeller while reducing the inlet relative velocity at the impeller inlet and primarily at the impeller inlet tip. A pair of face-to-face impellers located along the pump shaft are designed to increase the fluid velocity while transferring fluid to a vaneless radial diffuser. The diffuser then decreases fluid velocity and increases fluid pressure due to increasing diffuser volume. From the diffuser the fluid is conveyed into a fold-over volute which is likewise designed to increase fluid pressure while additionally eliminating flow patterns which would increase losses within the system. A replaceable cutwater is interposed between the diffuser and the volute to channel fluid into the volute and, finally, a hydrostatic slurry seal is coaxially located along the pump shaft so as to prevent leakage of the primary fluid from the high-pressure pump interior to the atmospheric pump exterior. Upon reversing the fluid flow, the pump discharge pipe or external outlet becomes turbine intake 102 and pump inlet volute 14 becomes the turbine radial discharge scroll 112. Discharge scroll 112 is then connected with cross-over duct 114 and leads via a second turbine intake 102 into the second stage of the let-down turbine 100.

20 Claims, 10 Drawing Sheets

C = ABSOLUTE VELOCITY
Cm = MERIDIONAL VELOCITY
Cu = TANGENTIAL COMPONENT OF ABSOLUTE VELOCITY

W = RELATIVE VELOCITY
Wu = TANGENTIAL COMPONENT OF RELATIVE VELOCITY
$U_1$ = IMPELLER INLET TIP SPEED
$\bar{U}_1$ = TURBINE RUNNER INLET TIP SPEED
$U_2$ = IMPELLER DISCHARGE TIP SPEED
$\bar{U}_2$ = TURBINE RUNNER DISCHARGE TIP SPEED

ALL VELOCITIES ARE IN FT./SEC.

Fig. 8

HIGH-PRESSURE HIGH-TEMPERATURE COAL SLURRY CENTRIFUGAL PUMP AND LET-DOWN TURBINE

CROSS REFERENCE TO RELATED APPLICATION

This is a continuation of co-pending application Ser. No. 088,884 filed on Oct. 29, 1979, and now abandoned which is a continuation-in-part of application Ser. No. 033,085, filed Apr. 25, 1979, and now abandoned.

BACKGROUND OF THE INVENTION

1. Field of the Invention

This invention relates to centrifugal pumps and let-down turbines and, more specifically, to high-temperature, high-pressure, high-volumetric flow rate centrifugal pumps and let-down turbines for the chemical process and power generating industries.

2. Description of the Prior Art

Coal liquefaction processes presently being considered for commercial development will require a high-capacity and high-pressure coal slurry feed system in the process. A scale-up of present-type reciprocating feed pumps to meet the high capacity will require a large number of units with attendant high capital and maintenance costs. As an alternate approach, high-volume centrifugal pumps appear promising in meeting the high-capacity requirement of the coal liquefaction plant. However, centrifugal pumps must be designed for high speeds to meet the high-pressure requirements, and may be subject to excessive internal wear because of high slurry velocities.

A comprehensive state-of-the-art study revealed that the centrifugal pump type most commonly used for pumping liquid/solid mixtures was found to be a low-speed, low-pressure, single-stage unit. In some applications, several of these units have been put in series to obtain high pressures.

For coarse slurry service, with solid sizes up to 2½ inches, the pump impellers are designed for wide vane passage width and thick sections. The impeller is generally shrouded and operates with a large running clearance with the casing. To reduce abrasive wear in the clearance and to minimize leakage or accumulation of solid particles, both the impeller front and back shrouds have cast-in, expeller vanes to reduce recirculation. Both, hard metals such as Ni-hard alloy, and soft rubber-lined cast iron are commonly used. For typical mining or dredging services, the pumps develop 50 to 75 psi with the impellers operating from 60 to 85 feet/sec tip speed. For a given impeller tip speed needed for developing head, there is a preference of using a larger diameter impeller running at a lower rpm to obtain low slurry flow velocity and long pump wear life.

For fine slurry service, with typical solid sizes of 10 to 325 mesh, higher speed, single-stage chemical processing pumps have been used. The impellers are shrouded, the operating clearance with the casing is closer, and both the wear ring and seals are flushed with clean fluids. Commonly used materials are austenitic stainless steel, Ni-hard, white iron, and high chrome steel. For combined corrosion and erosion resistance, a silicon carbide liner has been used. The slurry concentrations in chemical processing range from approximately 5 to 15% by weight; however, these same pumps have been used for coal/oil slurries up to 40% concentration (e.g., SRC Plant, Wilsonville). These pumps develop pressures on the order of 150 psi and operate at an impeller tip speed of 140 feet/sec.

The centrifugal slurry pump of the present invention is designed to function as a hydraulic slurry let-down turbine by reversing the flow through the pump. The turbine converts high-pressure fluid into a lower pressure state thereby converting kinetic fluid energy into rotational horsepower. As pressure decreases within the turbine, fluid contained gases are released and drawn out of the system by any appropriate means.

The hydraulic turbine can be used in any process where a regular flow control valve is used to reduce (let down) high-pressure flow to lower pressures. Therefore, a hydraulic turbine can replace high-pressure let-down valves currently used in the coal liquefaction system or in the geopressure-geothermal energy recovery system. In the coal liquefaction system, let-down valves are used to reduce the high-pressure, high-temperature liquid coal in the reactor to a lower pressure liquid coal in the filter feed tank for further processing in a vacuum tower (to obtain solid refined coal) or in a fractionator (to obtain light distillate fuel or fuel oil.) In the geopressure-geothermal energy recovery system, the let-down valve is used directly at the wellhead to recover dissolved methane from high-pressure brine in geopressure reservoirs.

In using the centrifugal slurry pump as a hydraulic slurry let-down turbine, replacing the high-pressure let-down valves, two important features are achieved: (1) the severe erosion problem in valves is eliminated by the gradual changes in pressure and velocities achieved through the hydraulic turbine, and (2) the potential energy of the high-pressure flow is recovered as useful shaft power by the hydraulic turbine. Moreover, the longer operating life and energy recovery of the hydraulic turbine will result in lower life cycle cost over the let-down valve.

Typical state-of-the-art slurry pump and let-down turbine problems include: (a) housing and impeller (turbine rotor) erosion which has been partially solved by increasing wall thickness, hardening surfaces, applying resistant coatings, maintaining low velocities, having no discontinuities, and having replaceable liners; (b) compacting and grinding clearance problems have been partially solved by enlarging clearances and installing expellers; (c) seal wear problems have been partially solved by expellers, flingers and fluid flush means; (d) impingement and abrasion on the tongue have been partially solved by hardening surfaces, maintaining low fluid velocity and having resilient coatings; and (e) excessive wear of wear rings has been partially solved by fluid flush means and wide clearances.

SUMMARY OF THE INVENTION

Accordingly, there is provided by the present invention a high-temperature, high-pressure, high-volumetric flow rate centrifugal pump for the chemical process industry. The pump of the present invention was invented for the coal process industry wherein coal slurries of up to about 50% particular matter were to be conveyed. However, the present principles developed for the present pump may also be adopted for other centrifugal pumps and, therefore, fall within the scope of the present invention. Specifically, the two-stage centrifugal pump of the present invention comprises a pump housing and at least one pair of external inlets and outlets for charging and discharging each stage of the pump. The inlets and outlets are located through the periphery of the pump for allowing on-line maintainance. Prerotator vanes are located along the interior wall of the pump housing and convey a fluid from the external inlet to the impeller while reducing the inlet relative velocity at the impeller inlet and primarily at the impeller inlet tip. A pair of face-to-face impellers located along the pump shaft are designed to increase the momentum energy of the fluid while transferring fluid to a vaneless radial diffuser. The diffuser then decreases fluid velocity and increases fluid pressure due to increasing diffuser volume. From the diffuser the fluid is conveyed into a fold-over volute which is likewise designed to increase fluid pressure while additionally eliminating any secondary flow patterns which would increase losses within the system. A replaceable cutwater is interposed between the diffuser and the volute to channel fluid into the volute and finally, a hydrostatic slurry seal is coaxially located along the pump shaft so as to prevent leakage of the primary fluid from the high-pressure pump interior to the atmospheric pump exterior.

By reversing the fluid flow through the centrifugal pump the let-down turbine embodiment of the present invention is obtained. When operating in the turbine mode, the pump discharge pipe becomes the turbine intake, the fold-over volute becomes the converging fold-over scroll, the cutwater becomes the transition guide, the radial vaneless diffuser becomes the radial vaneless turbine inlet nozzle, the pump impeller becomes the turbine rotor, the prerotator vanes become the straightening guide vanes and direct fluid flow into the pump inlet volute which becomes the turbine discharge scroll. As the fluid exits the discharge scroll, it is conveyed by way of a crossover duct into the second turbine intake and then repeats the same flow path through the turbine's second stage.

OBJECTS OF THE PRESENT INVENTION

Therefore, it is an object of the present invention to provide a high-pressure, high-temperature, high-volumetric flow rate centrifugal pump and let-down turbine which will operate in high-pressure, highly-abrasive environment.

Another object of the present invention is to provide a centrifugal pump and let-down turbine which will be capable of handling highly-abrasive materials.

Still another object of the present invention is to provide a high-efficiency centrifugal pump and let-down turbine.

Yet another object of the present invention is to provide a thrust-balanced centrifugal pump and let-down turbine.

Another object of the present invention is to provide a centrifugal pump that can be driven from either side and a let-down turbine which can provide drive power from either side.

Still another object of the present invention is to provide a two-stage pump and let-down turbine that can be connected in either series or parallel.

Another object of the present invention is to provide a two-stage pump and let-down turbine having an external crossover.

Still another object of the present invention is to provide a centrifugal pump and let-down turbine which presents minimal maintenance problems.

Another object of the present invention is to provide a centrifugal pump and let-down turbine having replaceable components.

Yet another object of the present invention is to provide a high-pressure, high-temperature pump and let-down turbine which will operate well in chemical processing plants.

Other objects, advantages and novel features of the present invention will become apparent from the following detailed description of the invention when considered in conjunction with the accompanying drawings.

BRIEF DESCRIPTION OF THE DRAWINGS

FIG. 1b is an inlet cross-section of the centrifugal pump taken through line 1b of FIG. 3a.

FIG. 1c is an outlet cross-section of the centrifugal pump taken through line 1c of FIG. 3a.

FIG. 3b is an enlargement of an upper quadrant of FIG. 3a.

DESCRIPTION OF THE PREFERRED EMBODIMENTS

Figure 1A:
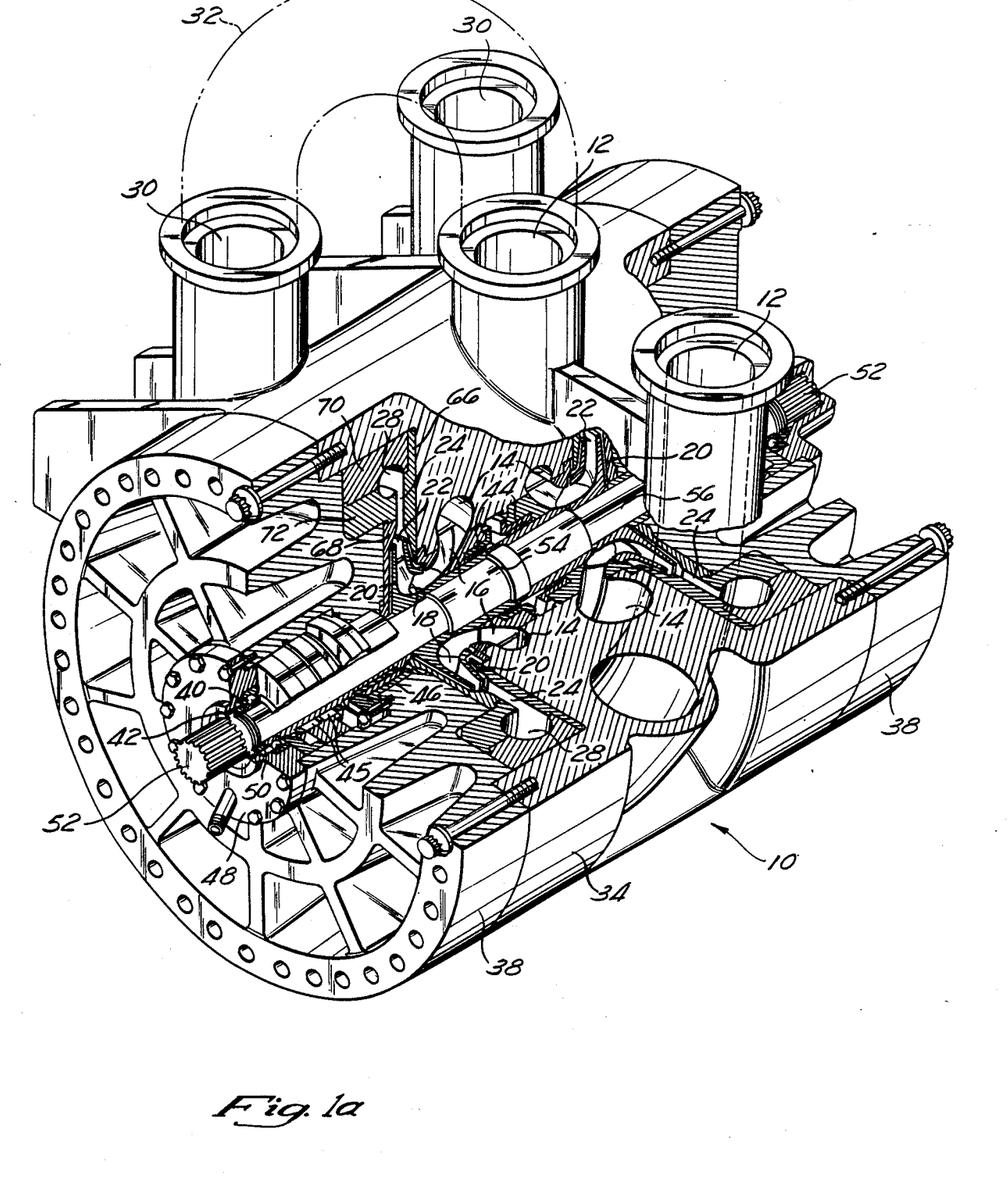
FIG. 1a is a three-dimensional cutaway view of the two-stage centrifugal slurry feed pump.
Figure 1B:
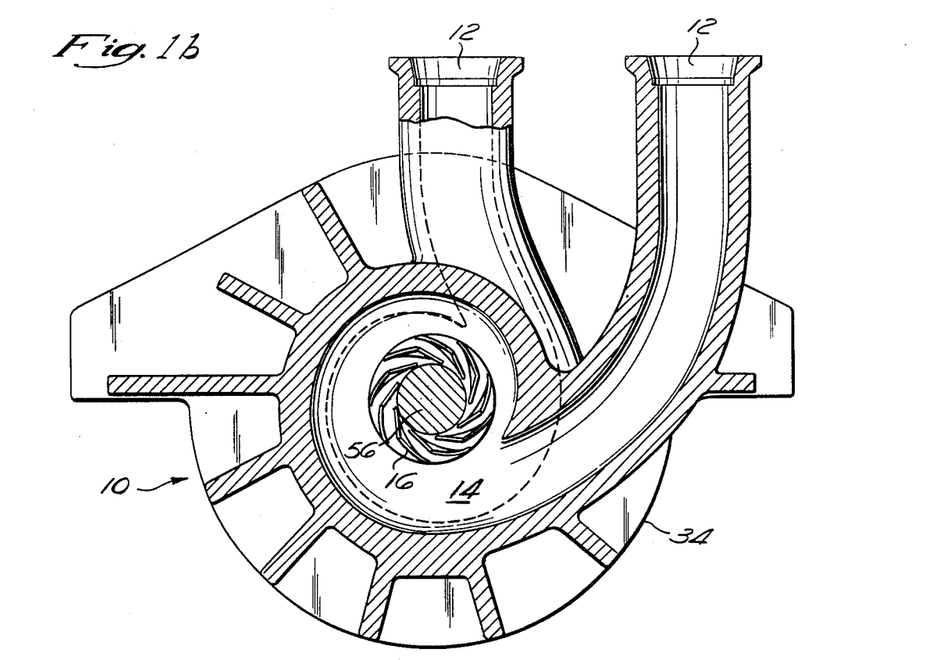
Figure 1C:
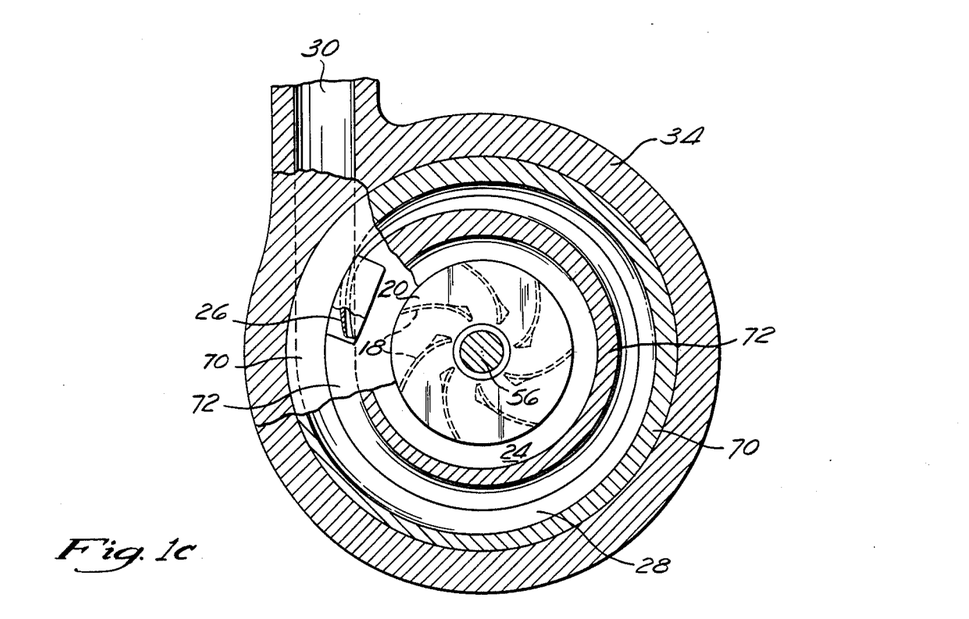
Figure 2A:
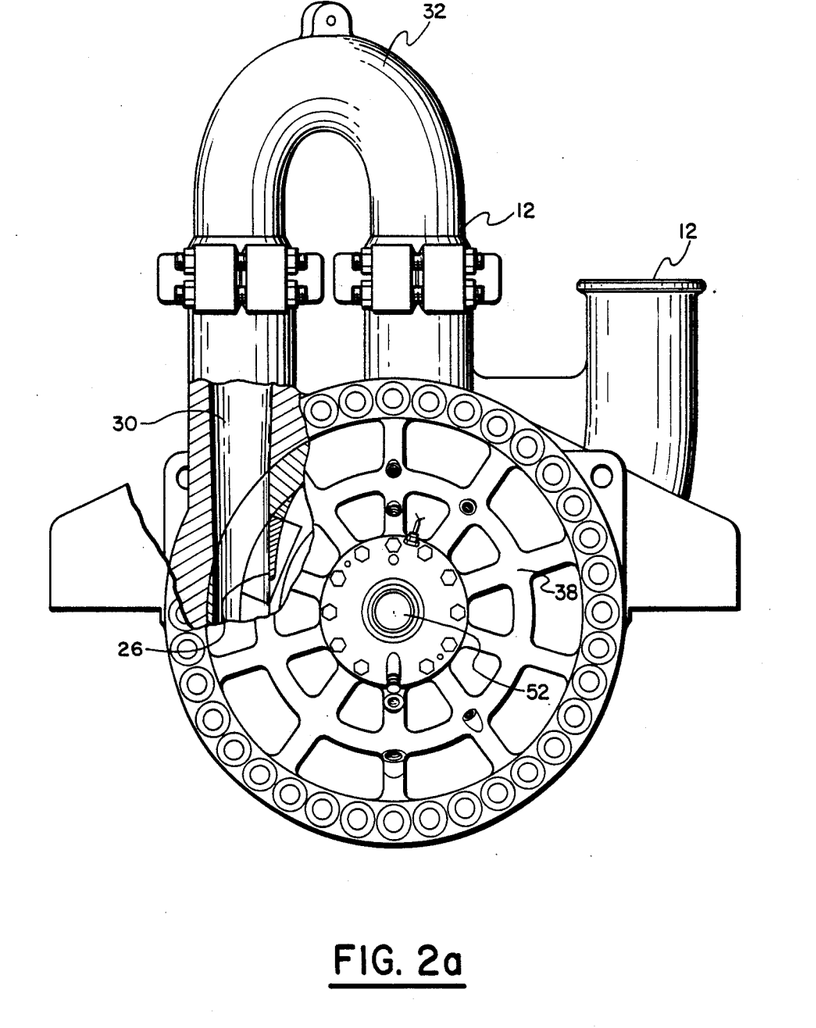
FIG. 2a is the end view of the two-stage centrifugal slurry feed pump.
Figure 2B:
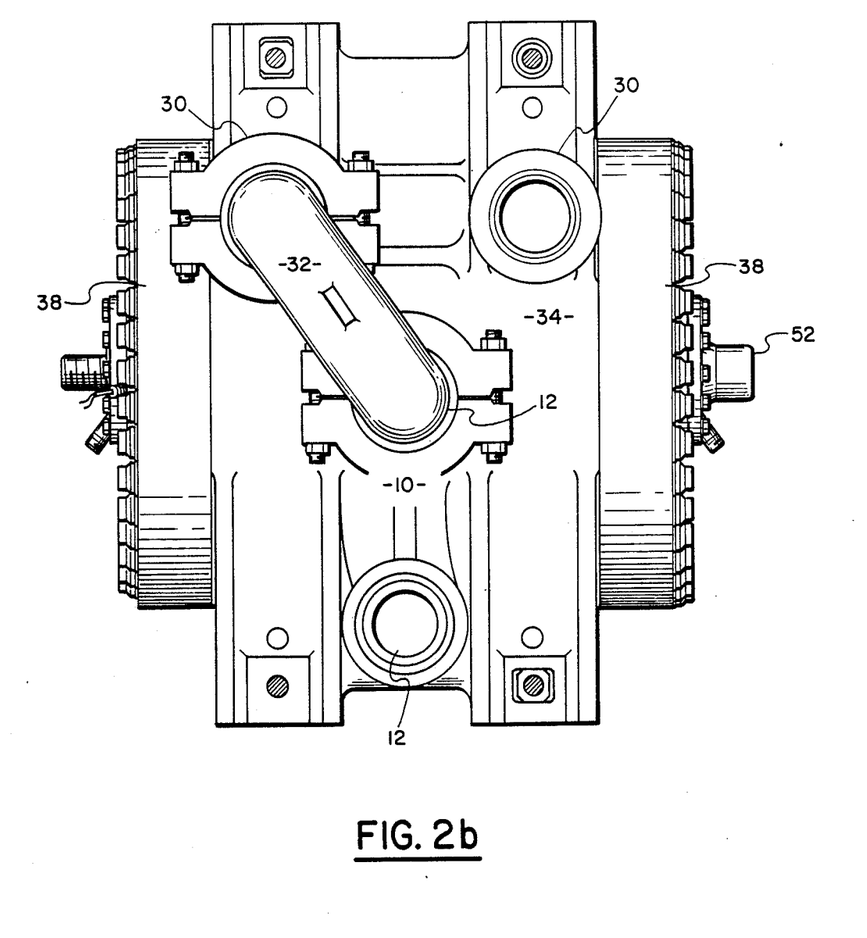
FIG. 2b is the top view of the two-stage centrifugal slurry feed pump showing both inlets and both outlets peripherally located on the main pump housing.

In accordance with a preferred embodiment of the present invention, there is provided a two-stage centrifugal pump module which has the capacity to work under severely adverse conditions. These conditions include high-temperature, high-pressure, high-volumetric flow rate, and a highly-erosive environment. Referring now to FIGS. 1-4 and 7 wherein like numerals represent like elements throughout the drawings, there is shown the two-stage centrifugal slurry feed pump. It should be noted that each stage of the face-to-face two stage pump operates in the same manner. Referring now to FIG. 1a, there is shown a three-dimensional cutaway view of the pump 10 wherein a fluid flows into the centrifugal pump module 10 through inlets 12 and into the inlet volutes 14. From the inlet volutes 14, the fluid is conveyed into the prerotator vanes 16 so as to reduce the inlet relative velocity at the impeller inlet tip 18. The prerotator vanes are designed to reduce erosion wear rate at the impeller inlet and primarily at the impeller inlet tip 18 by a factor of about two, and thereby increase wear life by 100%. The prerotator vanes effect this increase life in many ways. First, the cross-sectional area of the inlet volute is reduced thereby maintaining the relative velocity of the fluid to the prerotator vane. The prerotator vane deflects the fluid in direction of the impeller rotation and thereby reduces the relative fluid velocity to the impeller 20. Secondly, prerotation reduces impeller blade loading thereby reducing the number of impeller blades required, and allowing thicker blades for increased wear life. Prerotation also reduces impeller wear by allowing the impeller discharge blade angle to be more nearly radial and thereby reduces the force of the particulate material on the blade surface. Finally, prerotation reduces impeller diffusion ($W_2/W_1$) which reduces flow separation and secondary flow occurences which normally occur between the pressure to the suction side of the flow passage and produce corner eddies which cause localized erosion. FIG. 1b is a cross-section taken through the pump inlet.

After leaving the prerotation section of pump 10, the fluid passes through impeller 20 where its momentum energy is increased. The impeller is shrouded to reduce tip clearance, reduce secondary flows which produce erosion, and produce uniform discharge velocity to the vaneless diffuser. The fluid then exits from the outlet tip 22 of the impeller 20 into the vaneless radial diffuser 24 which is designed to reduce fluid velocity, and increase pressure as the volume of the diffuser 24 increases. The reduction in fluid velocity reduces volute cutwater erosion wear rate by a factor of three. The fluid is directed from the vaneless radial diffuser 24 by cutwater 26, FIGS. 1c, 4a, 4c and 4d, into a fold-over volute 28, FIGS. 4a to 4d, wherein pressure is increased and the fluid is finally channeled to external outlet 30. Fold-over volute 28 in combination with cutwater 26 is more specifically shown in FIGS. 4a to 4d. Careful examination shows that the cross-section of fold-over volute 28 increases from the cutwater 26 to external outlet 30, and that it is asymmetrically disposed with respect to the end of diffuser 24. It should be noted that in its preferred configuration, external outlet 30 serves as a secondary diffuser having a frusto-conical geometry. From the external outlet 30 the fluid can either be conveyed via an external cross-over 32 to the second stage within the pump module 10, thereby having the pump module connected in series, or the fluid may be conveyed to an external location thereby permitting the stages in the pump module 10 to be connected in parallel. It should be noted that although the preferred pump module is the two-stage pump module described above, these same principles could also be used for single-stage or multi-stage pump modules.

Depending upon the baseline pump requirements desired, the pump housing 34 may be made from any practical high-strength material, and may be cast with virtually any desired wall thickness. It should be noted that pump housing 34 as used herein includes within its meaning the pump body. However, due to the severity of the present pump requirements, the pump housing 34 should probably be made from a ductile steel casting, such as ASTM-216 G.R.WCB, and have an average wall thickness of about two inches.

Figure 3A:
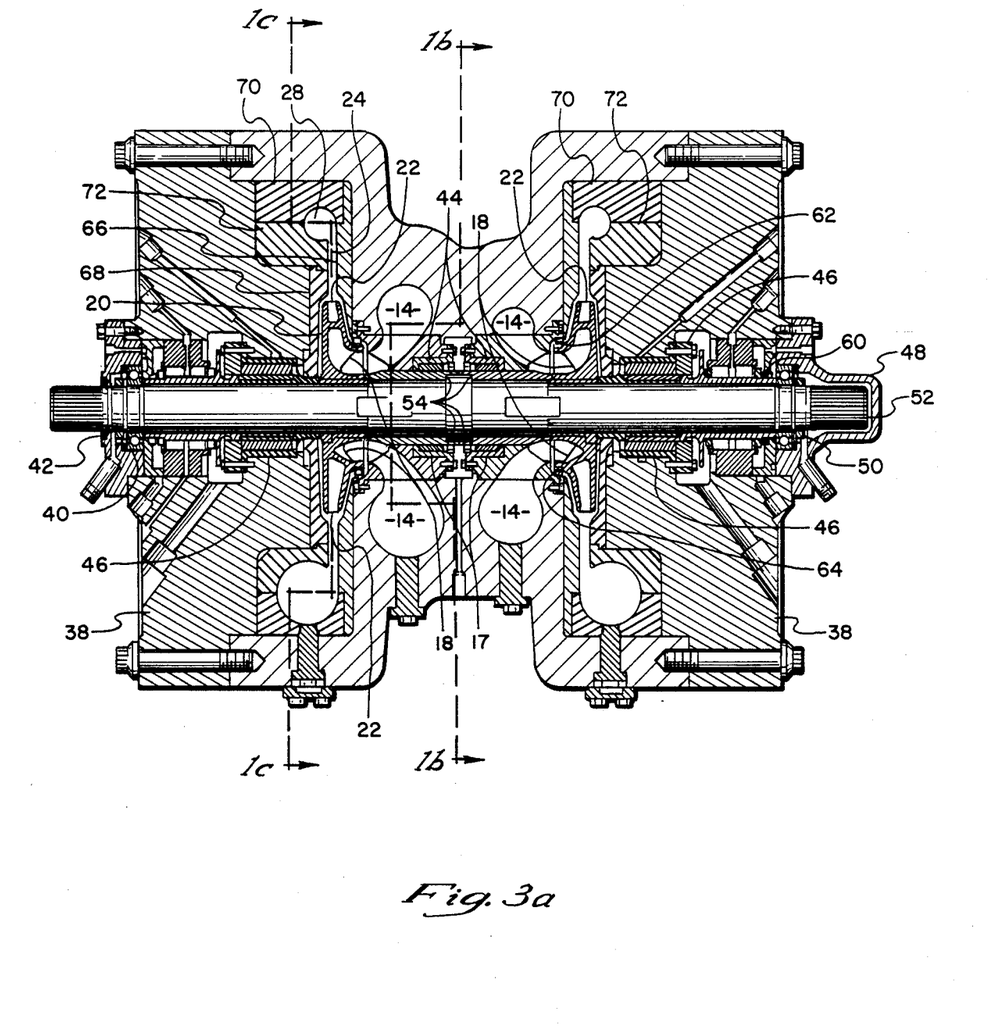
FIG. 3a is a cross-sectional view of the centrifugal pump taken vertically and axially through the center of the two-stage centrifugal pump.
Figure 3B:
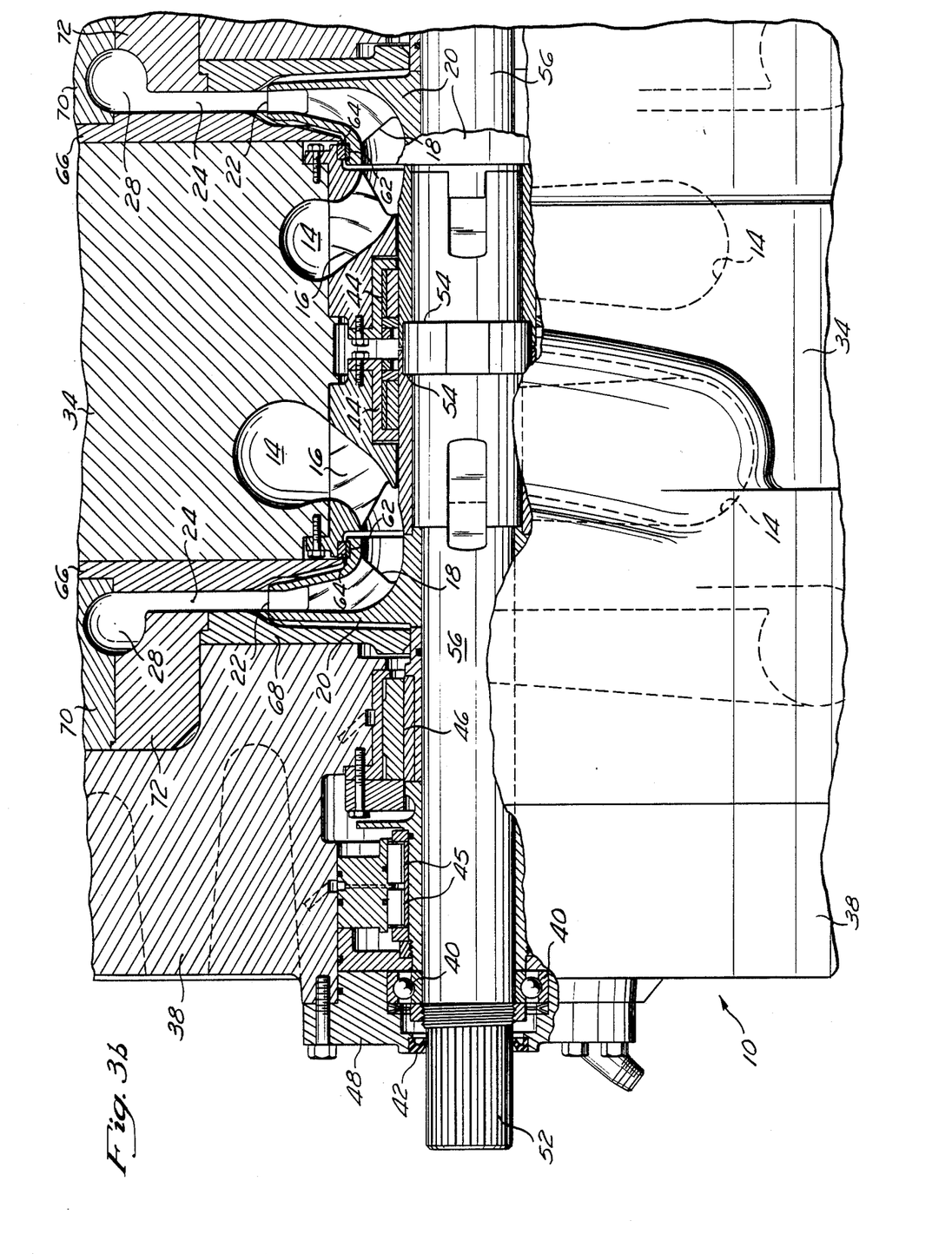
Figure 4A:
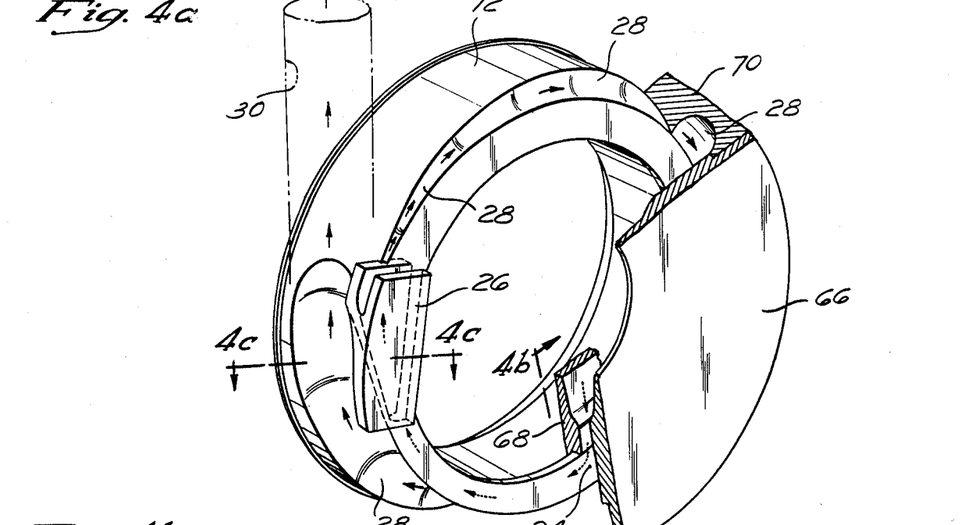
FIG. 4a is a three-dimensional cutaway of the fold-over volute.
Figure 4B:
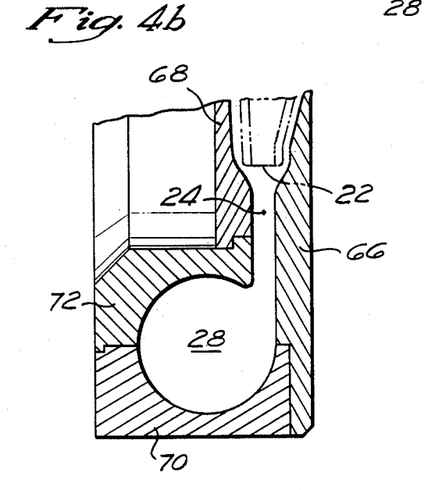
FIG. 4b is a cross-section of FIG. 4a taken along line 4b.
Figure 4C:
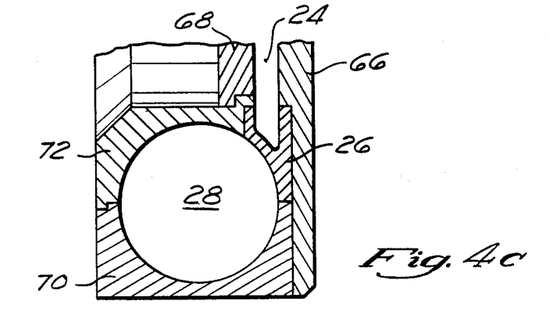
FIG. 4c is a cross-section of FIG. 4a taken along line 4c.
Figure 4D:
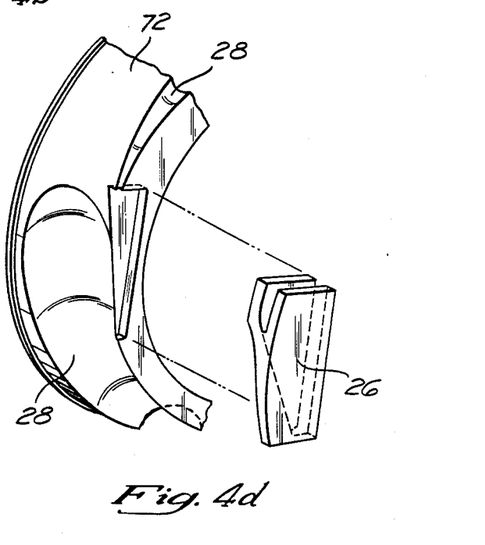
FIG. 4d is a segmented view of the fold-over volute and the cutwater.

Main pump housing 34 is completed with the addition of end cover plates 38. These cover plates 38 contain many of the functional elements which are necessary to support and seal the centrifugal pump module 10. The functional elements, shown in FIG. 3a, are the shaft support ball bearing 40 with closure lube seal 42, the double mechanical seal 45, and the primary hydrostatic slurry seal assembly 46. This primary hydrostatic slurry seal assembly 46, as well as the interstage seal 44, is more fully described in copending U.S. patent application Ser. No. 021,739 filed March 19, 1979 to Fritz C. Catterfeld, incorporated herein by reference. It should be noted that the functional elements should be identical and arrangement should be the same for both end cover plates 38. Each of the above elements may be removed from the end cover plate 38 without removing the cover plate assembly from the pump 10. However, in accordance with a preferred embodiment of the present invention, it is also possible to detach the cover plate 38 with the internally-assembled components after removing the bearing housing 48 and the bearing clamp nut 50.

To provide accessibility to the pump interior from either side of the pump without affecting the other side, the rotor components are stacked from each shaft end 52 toward a shoulder 54 in the middle of the main shaft 56.

The impellers 20 are assembled onto the main shaft 56 in a face-to-face position. This was done in part because inlet 12 for both pump stages is part of the main pump housing 34. The two impellers 20, 20 with their resulting axial thrust in opposite directions are used to balance the rotor assembly relative to the stationary parts of the pump 10. Although any high-strength materials can work, in its preferred configuration, the main shaft material is 4340 alloy steel and the sleeve components, including the impeller, are made from A-286, tungsten carbide, 4341, and 4330 alloy steel. Two sleeves on the shaft stack are preferably selected to be made from A-286 corrosion-heat-resistant alloy material. This was done to offset the differential thermal growth between the shaft and the sleeve components and keep the assembly stackup tight between ambient and operating temperature of approximately 550° F. It should be noted that the subject pump could also be designed to be run at ambient temperatures. If this were the case, thermal expansion would not be a problem and any other appropriate material could be selected.

Ball bearings 40 are also part of the rotor assembly. They are positioned on both ends of the shaft 56 and clamped with a torque nut 50. These main rotor components, along with shaft 56 and impellers 20, should all be carefully balanced during manufacture to help prevent excessive wearing.

Each external inlet 12 is designed to convey the fluid from the exterior of the pump housing to a means for circumferentially directing fluid flow. Although any channeling means would work, a plurality of prerotator vanes 16 located along the interior wall of pump housing 34 are preferred for turning the fluid flow in the direction of impeller rotation, reducing inlet relative velocity at the impeller inlet tip and thereby reducing abrasive erosion on the impeller inlet vane tip. Although the prerotator vanes 16 can be integrally located along the interior wall of the pump housing, it is preferred that the prerotator vanes 16 be cast separately so as to make them removable and replaceable. Although any high-wear-resistant material could be used for the casting of the prerotator vanes 16, the preferred material is cast white iron. This cast white iron can then be surface-treated with a hardening agent such as a boride coating or a tungsten carbide coating. By so protecting the prerotator vanes 16 one adds to the longevity of these components. Also, as an optional embodiment, inlet volutes 14 can be interposed between the external inlet 12 and the prerotator vanes 16. These inlet volutes 14 will, like the prerotator vanes 16, help to reduce inlet velocity so as to assist the prerotator vanes 16 in matching the fluid velocity with the impeller's inlet tip velocity, thereby significantly decreasing erosion on the impeller inlet and primarily at the impeller inlet tip 18.

The pump impellers 20 in both stages and for all modules are of the same basic design; however, it should be noted that the left and right-hand impellers are mirror images of each other. Although the impellers 20 may be made from any high-strength material, cast white iron is preferred because of the extreme hardness and the minimum yield properties. However, this material will not permit the impeller to carry its own torque with a normal shaft coupling; therefore, a hub insert made from modified 4330 steel material will preferably be brazed into the hub during the fabrication process. Both the insert and the impeller become an integral part when joined by brazing. The shrouded impeller wear ring surface 62, which prevents backflow from the impeller tip to the impeller inlet, is extremely sensitive to wear and usually the area of first impeller failure on other slurry pumps. The impeller wear ring and the mating stationary ring 64 are therefore preferably made from tungsten carbide K-703 for long wear life. The tungsten carbide ring 62 is assembled onto the impeller 20 with the combination of a partially threaded shrink fit ring, and is purged by a high-pressure clean fluid.

Radial diffusion of the fluid flow after it leaves the impeller 20 requires a circumferential channel of sufficient length to adequately reduce the flow velocity from about 118 feet/sec to about 70 feet/sec before it enters the volute 28. The radial diffuser 24 comprises two parallel walls, diffuser inner liner 66 and diffuser outer liner 68, with the impeller discharge opening. The diffuser walls are formed by two inserts of very hard cast white iron plates.

Wear is expected to be severe in the diffuser region because of the high velocity of the slurry. Therefore, hardfacing of the diffuser surfaces, although optional, would be a preferred embodiment. Also, due to the erosion problems encountered in the present system, it is preferred that the diffuser be vaneless. The diffuser plates are held in position by the pump housing 34, the volute inserts 70 and 72, and the cover plate 38. They are secured against rotation by positioning pins. Although any volute 28 geometry could be used, a foldover volute 28 would be preferred since it eliminates losses due to secondary flow patterns. The volute 28 can be an integral part of the pump housing 34. However, in the preferred configuration, the volute 28 is designed as a replaceable insert. The hydrodynamic contoured volute passage is constructed within two concentric ring inserts. The volute inserts 70 and 72 are fitted into a concentric cavity within the pump housing 34 during pump assembly. When assembled, the fluid discharge passage formed by the outer of the two rings will mate with the discharge port in the main pump housing 34. The inner volute ring 72 contains the cut-water 26 or volute tongue. The cut-water 26 is designed as an additional insert and is interposed between the inner volute ring 72 and the inner diffuser plate 66. In the preferred configuration, the volutes are made from cast white iron and the cutwater 26 is made from K-703 tungsten carbide. The split volute configuration will allow for access to the volute interior and will provide open surfaces for further surface treatment such as optional tungsten carbide hardfacing.

Because of the 550° F. pump operating temperature and the difference in thermal expansion between the cast white iron and the tungsten carbide material, the carbide impeller wear ring is installed with a radial clearance. Upon reaching the operating temperature, the base material has expanded and centered the carbide ring.

The shrink fit ring material is 4340 alloy steel and the exposed position of the ring can be hardfaced with tungsten carbide flame spray deposit.

Each stage of the centrifugal pump module 10 has at least one external inlet 12 and outlet 30 located through the periphery of the main pump housing 34. These external inlets 12 and outlets 30 permit charging and discharging of the stages, while allowing on-line maintenance of the pump 10. In the preferred configuration, having a two-stage centrifugal pump module 10, an external cross-over duct 32 can be added for series operation. In this mode, the discharge or outlet 30 from the lower pressure stage is fed into the inlet 12 of the higher pressure stage by means of the cross-over duct 32. The duct 32 can be made from any high-strength material, but it is preferred that the material match that of the main pump housing 34. It should be noted that external outlets 30 are preferably of frustoconical geometry and serve as secondary diffusers.

The preferred hydrostatic main seal, described in copending U.S. patent application Ser. No. 021,739 filed March 19, 1979 to Fritz C. Catterfeld, incorporated herein by reference, is capable of sealing at least 325-mesh coal/oil slurry at a temperature of about 550° F. and at a differential pressure ranging from about 250 psi to over about 3000 psi. However, depending upon the actual pump requirements various seals with various capabilities up to as much as 5000 psi could be used. Likewise, the preferred interstage seal 44 is also described and claimed in copending U.S. patent application Ser. No. 064,320 filed August 6, 1979, to Fritz C. Catterfeld, incorporated herein by reference. This particular interstage seal 44 was designed to operate under the severe conditions previously described. However, it should again be noted that any common interstage seal would work depending upon the baseline pump requirement.

Although the pump principles and components described in the present invention can be modified for use under ambient conditions, operating temperature requirements are determined by processing temperatures. For the present system the preferred operating temperature is about 550° F. Pump operating temperatures in this range require thermal conditioning of the pump prior to startup. This must be done for several important reasons. First and most important is the prevention of thermal shock which could damage important pump components. Second, the pump driveline must run concentric with the prime mover. The pump is mounted on the horizontal centerline with a three-point mount system on four pump supports. One mount on the pump input side is fixed, while the opposite mount on the input side allows for radial thermal growth. The third mount on the pump output side provides for axial thermal growth while the fourth mount provides freedom in any horizontal direction. The pump grows from the fixed position mount; therefore, the pump centerline is shifting in the horizontal plane relative to the prime mover. The magnitude of the thermal shift is based on the ambient temperature mounting setup; therefore, the pump must be heated to a temperature level such that the pump and the prime mover driveline are nearly concentric. The third thermal conditioning requirement is mandated by differential growth of internal pump components, particularly where tungsten carbide parts are involved. For example, a tungsten carbide impeller wear ring which is installed with 0.014-inch diametral clearance at ambient temperature will not be centered until the pump reaches between 350°-400° F.

Similarly, the shaft rotor assembly having a small mass compared to the housing assembly will expand more rapidly than the housing; therefore, the shaft support bearings are mounted axially and flexibly with a frustoconical flexure such as "Belleville" springs. These springs will be compressed further than their installation clearance during thermal transition; however, they will reach the proper setting at operating temperature. The best method of conditioning may be the injection of hot fluid into the pump proper until the desired operating temperature is reached for slurry admission and pump startup. The pump should be wrapped into an insulation blanket to prevent large thermal gradients between the pump interior and exterior which could generate high thermal stresses in localized areas and lead to structure cracks. Shutdown of the pump for inspection purposes or other reasons involves draining the pump interior and removing the slurry which otherwise would harden during the cool-down process. Drain plugs 80 are located in the lower cavities of the inlet and discharge volutes.

Figure 5:
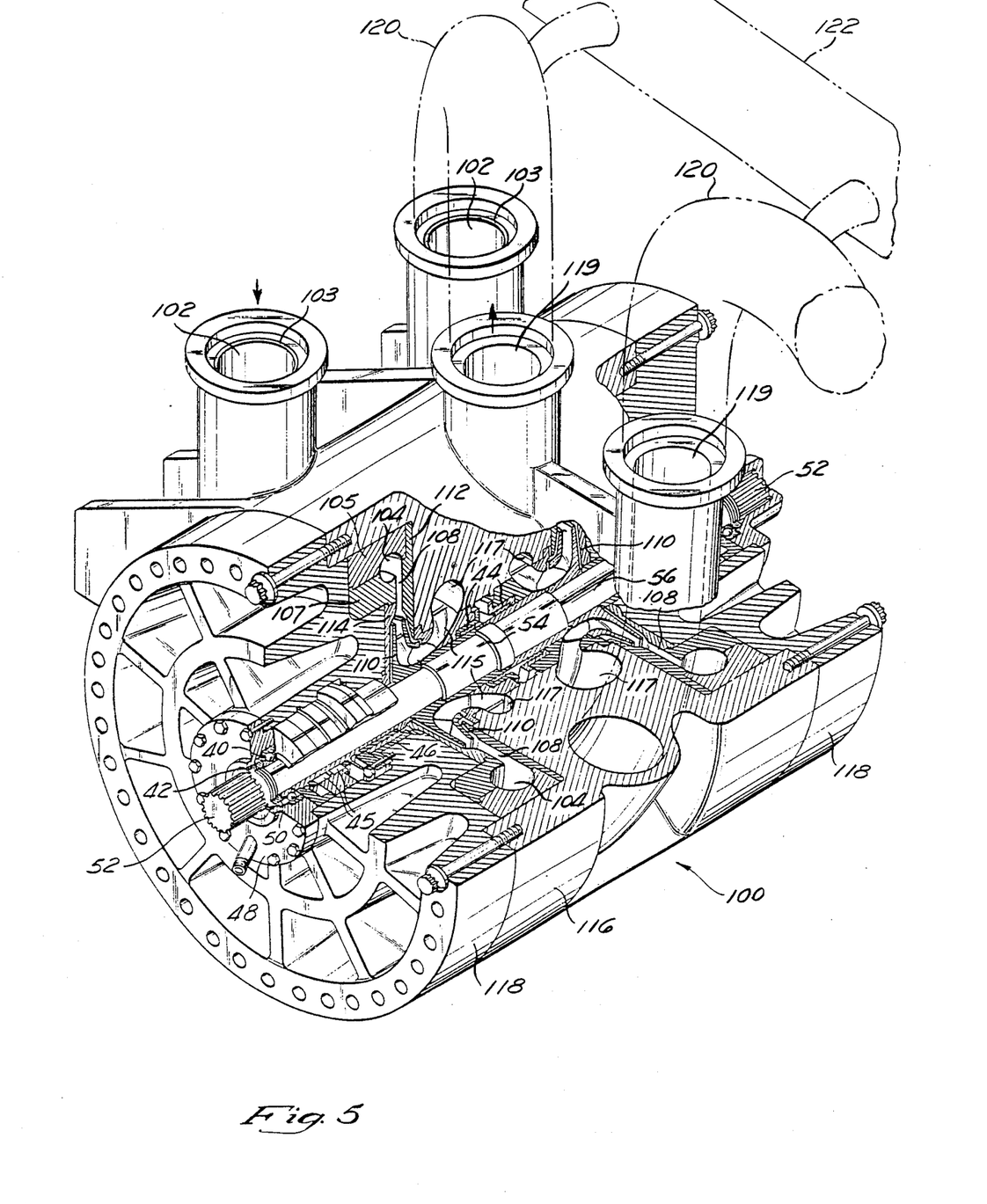
FIG. 5 is a three-dimensional cutaway view of the two-stage let-down turbine.
Figures 6A, 6B, 6C, 6D:
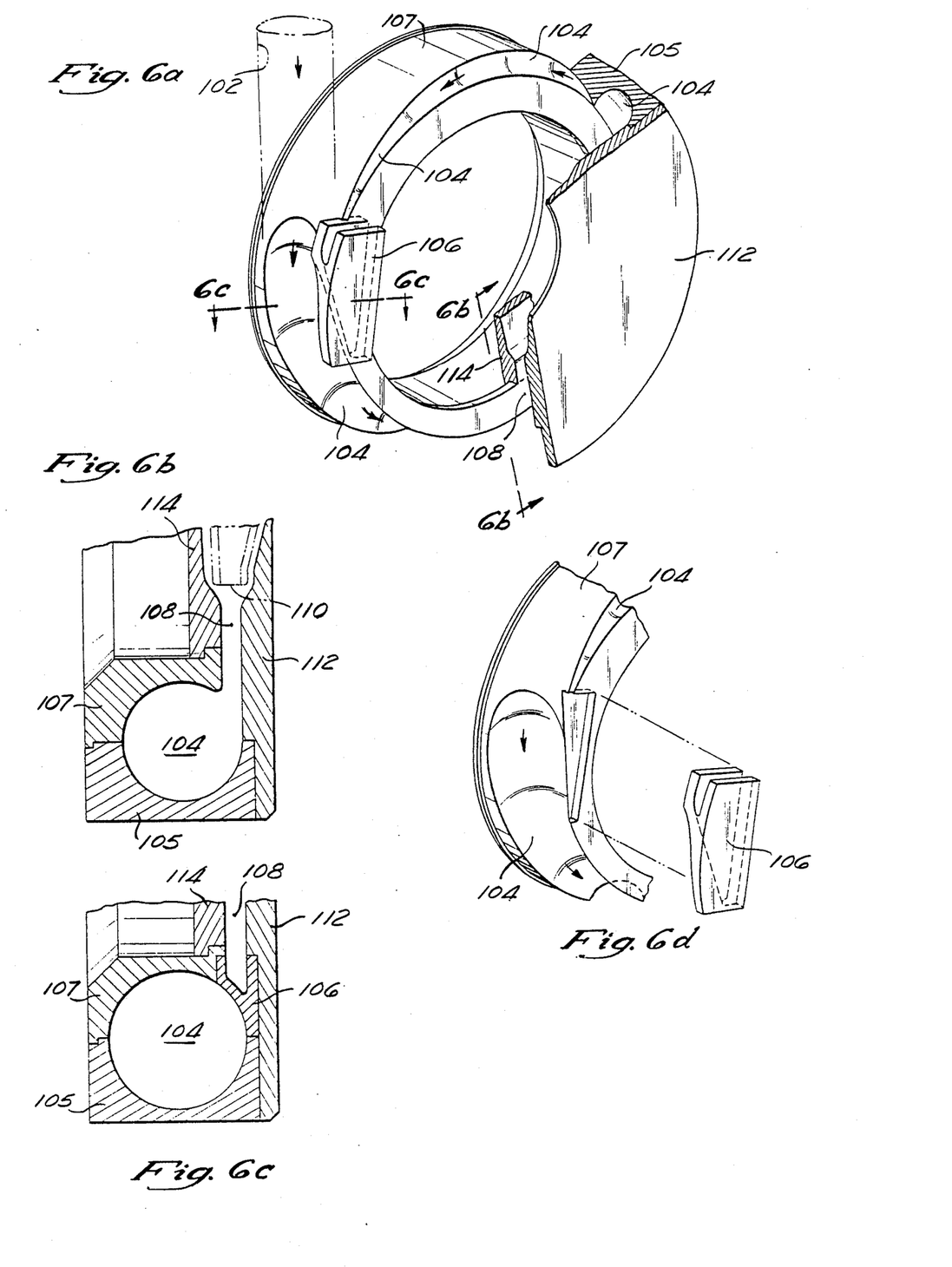
FIG. 6a is a three-dimensional cutaway of the converging fold-over scroll.
FIG. 6b is a cross-section of FIG. 6a taken along line 6b.
FIG. 6c is a cross-section of FIG. 6a taken along line 6c.
FIG. 6d is a segmented view of the converging fold-over scroll and the scroll transition guide.
Figure 8:
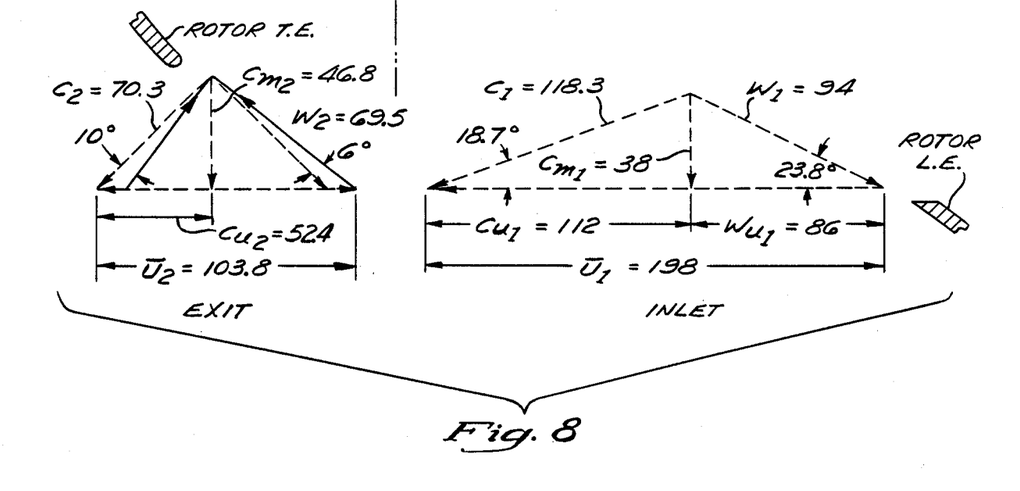
FIG. 8 is a turbine rotor velocity diagram.

It has additionally been found that the centrifugal slurry pump generally designated 10 can operate as a let-down turbine generally designated 100, FIG. 5, by reversing the fluid flow through the pump 10. Thus, in accordance with the second set of preferred embodiments of the present invention, there is provided a two-stage let-down turbine module 100 which has the capacity to work under severly adverse conditions. These conditions include high-temperature, high-pressure, high-volumetric flow rate, and in a highly-erosive environment. Referring now to FIGS. 5, 6, and 8 wherein like numerals represent like elements throughout the drawings, there is shown the two-stage slurry let-down turbine 100. It should be noted that each stage of the face-to-face two-stage let-down turbine 100 operates in the same manner. Referring now to FIG. 5, there is shown a three-dimensional cutaway of the let-down turbine 100 wherein a fluid flows into the let-down turbine module 100 through turbine inlet 102 and into converging fold-over scroll 104. In the preferred operating conditions, inlet 102 incorporates hard metal insert 103 while converging fold-over scroll comprises inserts 105 and 107. From the converging scroll 104, the fluid is conveyed across scroll transition guide 106, FIGS. 6a, 6c and 6d, into the vaneless radial turbine inlet nozzle 108 accelerating the fluid toward the turbine rotor 110. The turbine rotor 110 will rotate in the direction of the flow imposed by the tangential inlet 102 and the converging fold-over scroll 104. The vaneless radial turbine inlet nozzle 108 comprises a smooth-finished inner liner plate 112 and a smooth-finished outer liner plate 114 spaced at the same width as the turbine rotor inlet width. The plates 112 and 114 like scroll plates 105 and 107 are made up of very hard white cast iron. Also, the surfaces of the liner plates 112 and 114 match closely with the profile scroll contours. As with the pump 10, surfaces in high-wear areas receive a hard surface coating such as a boride coating.

After expending a portion of the kinetic energy, the fluid leaves the radial inflow turbine rotor 110 and is discharged through flow straightening vanes 115, into an exit scroll 117 (which is part of the cast main turbine housing) and let-down turbine outlet 119. The fluid flow is then either (1) returned by means of a crossover duct 120 into the second turbine stage inlet 102 where the let-down process is identical in process to that described for the first stage thereby connecting the let-down turbine in series, or (2) the fluid may be conveyed to an external location thereby permitting the stages of the let-down turbine 100 to be connected in parallel. It should be noted that although the preferred let-down turbine module 100 is the two-stage let-down turbine module described above, the same principles could also be used for single-stage or multi-stage turbine modules.

The differential let-down pressure is 250 psi per stage. With two stages in series, the total delta let-down pressure is 500 psi per module. The differential pressure leaving the face-to-face turbine rotors must be sealed with an interstage seal arrangement. One such interstage seal 44 arrangement is described for use in the centrifugal slurry pump 10 wherein two hydrostatic seals are pressurized with purge fluid, supplied at a higher pressure level than the let-down turbine 100 interior. Similarly, high-pressure slurry is sealed against environment and other sensitive turbine components such as bearings with a hydrostatic seal 46 that operates with a compatible purge fluid on the principle of hydraulic interface between two different fluids whereby the flow velocity of the interfacing fluids is reduced to theoretical zero.

Depending upon the baseline let-down turbine requirements desired, the let-down turbine housing 116 may be made from any practical high-strength material, and may be cast with virtually any desired wall thickness. It should be noted that let-down turbine housing 116 as used herein includes within its meaning the let-down turbine body. Due to the severity of the present let-down turbine requirements, the let-down turbine housing 116 should probably be made from a ductile steel casting, such as ASTM-216, G.R.WCB, and have an average wall thickness of about two inches.

Main let-down turbine housing 116 is completed with the addition of end cover plates 118. These cover plates 118 contain many of the functional elements which are necessary to support and seal the let-down turbine module 100. The functional elements are the same as shown in FIG. 3a for the pump 10 and include the shaft support ball bearing 40 with closure lube seal 42, the double mechanical seal 45, and the primary hydrostatic slurry seal assembly 46. This primary hydrostatic slurry seal assembly 46 and the interstage seal 44 are more fully described in copending U.S. patent application Ser. No. 021,739 filed March 19, 1979 and Ser. No. 064,320 filed August 6, 1979, to Fritz C. Catterfeld, incorporated herein by reference. It should be noted that the functional elements should be identical and arrangement should be the same for both end cover plates 118. Each of the above elements may be removed from the end cover plates 118 without removing the cover plate assembly from the let-down turbine 100. However, in accordance with a preferred embodiment of the present invention, it is also possible to detach the coverplate 118 with the internally-assembled components after removing the bearing housing 48 and the bearing clamp nut 50.

To provide accessibility to the let-down turbine interior from either side of the let-down turbine without affecting the other side, the rotor components are stacked from each shaft end 52 toward a shoulder 54 in the middle of the main shaft 56.

The turbine rotors 110 are assembled onto the main shaft 56 in a face-to-face position. This was done in part because inlet 102 for both let-down turbine stages is part of the main let-down turbine housing 116. The two turbine rotors 110, 110 with their resulting axial thrust in opposite directions are used to balance the rotor assembly relative to the stationary parts of the let-down turbine 100. Although any high-strength materials can work, in its preferred configuration the main shaft material is 4340 alloy steel and the sleeve components, including the turbine rotor, are made from A-286, tungsten carbide, 434, and 4330 alloy steel. Two sleeves on the shaft stack are preferably selected to be made from A-286 corrosion-heat-resistant alloy material. This was done to offset the differential thermal growth between the shaft and the sleeve components and keep the assembly stackup tight between ambient and operating temperature of approximately 550° F. It should be noted that the subject let-down turbine could also be designed to be run at ambient temperatures. If this were the case, thermal expansion would not be a problem and any other appropriate material could be selected.

Ball bearings 40 are also part of the rotor assembly. They are positioned on both ends of the shaft 56 and clamped with a torque nut 50. These main rotor components, along with shaft 56 and turbine rotors 110, should all be carefully balanced during manufacture to help prevent excessive wearing.

Figure 7:
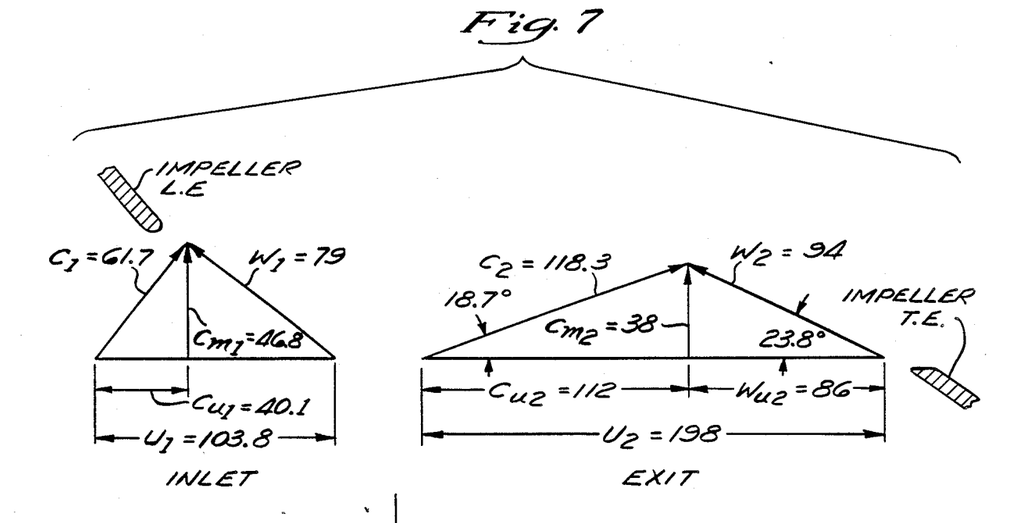
FIG. 7 is a pump impeller velocity diagram.

In operation, both the absolute velocity and pressure of the slurry flow are reduced in the hydraulic slurry turbine 100, thus transferring energy to the turbine rotor 110. The flow velocity diagram for the centrifugal slurry pump 10 is shown in FIG. 7. The flow velocity diagram for the same pump operating as a hydraulic turbine is shown in FIG. 8. The only major difference is in the direction of the velocity vectors reflecting flow reversing through the pump.

As seen in FIGS. 7 and 8, the velocities at the inlet to the turbine rotor 110 are identical to those for the pump impeller discharge, except for direction. The velocities at the discharge of the turbine rotor is seen to be slightly different from the pump impeller inlet by an angle of 6 degrees (shown by dotted arrows). This results from the pump impeller turning the flow less when operating as a turbine rotor. Therefore, more rotation, or whirl, is left in the flow at the discharge of the turbine rotor than produced by the prerotator vanes at the pump impeller inlet.

Thus, the larger flow rotation left by the turbine rotor will result in the flow entering the straightening guide vanes at a 10-degree negative incidence angle, producing a slight flow mismatch and potentially higher erosion. However, a slight trim (cutting back) of the straightening vane leading edge (prerotator vane trailing edge) will achieve 0-degree incidence flow angle and, thus, will avoid both flow losses and erosion.

As pressure is reduced in the hydraulic turbine 100, dissolved gas will gradually come out of solution and produce a low vapor-liquid, volume fraction flow mixture. In a rotational fluid flow, low density fluid, such as vapor, will collect toward the core or center of the free-stream flow and, thus, away from hydraulic flow surfaces. The rotational flow, or whirl, at the discharge of the turbine rotor is a location where vapor can be collected and bled from each turbine stage through an appropriate hollow shaft. Another appropriate gas collector means is depicted in FIG. 5 wherein collector tube 122 is shown as drawing off the release gas from crossover ducts 120.

Because of the 550° F. let-down turbine operating temperature and the difference in thermal expansion between the cast white iron and the tungsten carbide material, the carbide turbine rotor wear ring is installed with a radial clearance. Upon reaching the operating temperature, the base material has expanded and centered the carbide ring.

The shrink fit ring material is 4340 alloy steel and the exposed position of the ring can be hardfaced with tungsten carbide flame spray deposit.

Each stage of the let-down turbine module 100 has at least one external inlet 102 and outlet 119 located through the periphery of the main let-down turbine housing 116. These external inlets 102 and outlets 119 permit charging and discharging of the stages, while allowing on-line maintenance of the let-down turbine 100. In the preferred configuration, having a two-stage let-down turbine module 100, an external crossover duct 120 can be added for series operation. In this mode, the discharge or outlet 119 from the higher pressure stage is fed into the inlet 102 of the lower pressure stage by means of the crossover duct 120. The duct 120 can be made from any high-strength material, but it is preferred that the material match that of the main let-down turbine housing 116.

The preferred hydrostatic main seal, described in copending U.S. patent application Ser. No. 021,739 filed March 19, 1979 Fritz C. Catterfeld, incorporated herein by reference, is capable of sealing at least 325-mesh coal/oil slurry at a temperature of about 550° F. and at a differential pressure ranging from about 3000 psi. However, depending upon the actual let-down turbine requirements various seals with various capabilities up to as much as 5000 psi could be used. Likewise, the preferred interstage seal is described and claimed in copending U.S. patent application Ser. No. 064,320 filed August 6, 1979 to Fritz C. Catterfeld, incorporated herein by reference. This particular interstage seal was designed to operate under the severe conditions previously described. However, it should again be noted that any common interstage seal would work depending upon the baseline let-down turbine requirement.

Although the let-down turbine principles and components described in the present invention can be modified for use under ambient conditions, operating temperature requirements are determined by processing temperatures. For the present system, the preferred operating temperature is about 550° F. Let-down turbine operating temperatures in this range require thermal conditioning of the let-down turbine prior to startup. This must be done for several important reasons. First and most important is the prevention of thermal shock which could damage important let-down turbine components. Second, the let-down turbine drive-line must run concentric. The let-down turbine is mounted on the horizontal centerline with a three-point mount system on four let-down turbine supports. One mount on the let-down turbine input side is fixed, while the opposite mount on the input side allows for radial thermal growth. The third mount on the let-down turbine output side provides for axial thermal growth while the fourth mount provides freedom in any horizontal direction. The let-down turbine grows from the fixed position joint; therefore, the let-down turbine centerline is shifting in the horizontal plane. The magnitude of the thermal shift is based on the ambient temperature mounting setup; therefore, the let-down turbine must be heated to a temperature level such that the let-down turbine and the prime driveline are nearly concentric. The third thermal conditioning requirement is mandated by differential growth of internal let-down turbine components, particularly where tungsten carbide parts are involved. For example, a tungsten carbide turbine rotor wear ring which is installed with 0.014-inch diametral clearance at ambient temperature will not be centered until the pump reaches between 350°–400° F.

Similarly, the shaft rotor assembly having a small mass compared to the housing assembly will expand more rapidly than the housing; therefore, the shaft support bearings are mounted axially and flexibly with a frustoconical flexure such as "Belleville" springs. These springs will be compressed further than their installation clearance during thermal transition; however, they will reach the proper setting at operating temperature. The best method of conditioning may be the injection of hot fluid into the let-down turbine proper until the desired operating temperature is reached for slurry admission and let-down turbine startup. The let-down turbine should be wrapped into an insulation blanket to prevent large thermal gradients between the let-down turbine interior and exterior which could generate high thermal stresses in localized areas and lead to structure cracks. Shutdown of the let-down turbine for inspection purposes or other reasons involves draining the let-down turbine interior and removing the slurry which otherwise would harden during the cooldown process. This is accomplished in the same manner as described for the centrifugal slurry pump.

Thus, it is apparent that there is provided by this invention a high-temperature, high-pressure, high-volumetric flow rate centrifugal pump and let-down turbine for the chemical process, dredging, and materials handling industries.

It is to be understood that what has been described is merely illustrative of the principles of the invention and that numerous arrangements in accordance with this invention may be devised by one skilled in the art without departing from the spirit and scope thereof.

What is claimed as new and is desired to be secured by Letters Patent of the United States is:

1. A centrifugal pump for an abrasive slurry comprising:
   a unitary pump housing;
   an inlet means and an outlet means located through the periphery of the pump housing and substantially transverse to an axis of the pump;
   two end plates detachably connected to said pump housing for enhancing on-line maintenance of said pump;
   a pump shaft axially located between and supported by said end plates;
   an impeller coaxially located on said pump shaft for increasing momentum energy of an abrasive slurry passing therethrough;
   means for circumferentially directing fluid flow, said means being located along the interior wall of said pump housing for turning fluid flow in the direction of impeller rotation and reducing inlet relative velocity at the impeller inlet and primarily at the impeller inlet tip diameter, said means comprising pre-rotator vanes located along the interior wall of said pump housing;
   a wall in said housing disposed about the periphery of said impeller defining a vaneless radial diffuser means to receive the output of abrasive slurry from said impeller and reduce its velocity a sufficient amount to inhibit abrasive erosion of downstream surfaces, said diffuser means comprising replaceable abrasive-resistant inserts which form an inner surface of said diffuser means which is exposed to the abrasive slurry;
   an arcuate fold-over volute extending substantially continuously about the periphery of said wall defining said diffuser means;
   a cutwater interposed in an opening in said wall between said diffuser means and said volute for directing abrasive slurry from said diffuser means tangentially into said volute and;
   means for sealing and supporting said pump shaft wherein said sealing and supporting means is coaxially positioned along said pump shaft and interposed said impeller and said end plates for preventing leakage of said slurry and for providing bearing means for said shaft.

2. A let-down turbine for an abrasive slurry which comprises:
   a turbine housing;
   two end plates detachably connected to said turbine housing, for enhancing on-line maintenance;
   at least an inlet means and an outlet means, said inlet means and outlet means being located through the periphery of said turbine housing and substantially transverse to an axis of said turbine;
   a turbine shaft axially located between and supported by said end plates;
   a turbine rotor coaxially located on said turbine shaft;
   a converging fold-over scroll disposed to receive abrasive slurry from said turbine inlet means;
   a vaneless radial inlet nozzle radially disposed to receive abrasive slurry from said converging fold-over scroll for accelerating incoming fluid flow, said nozzle being formed from replaceable inserts of a material having a greater resistance to abrasion than that of said housing;
   a replaceable scroll transition guide interposed between said scroll and said nozzle for directing abrasive fluid from said scroll into said nozzle;
   a set of straightening vanes disposed along the inner wall of said turbine housing to receive the fluid discharge from said turbine; and
   means for sealing and supporting said turbine shaft wherein said sealing and supporting means is coaxially positioned along said turbine shaft and interposed said turbine rotor and said end plates for preventing fluid leakage and for providing bearing means.

3. A two-stage centrifugal pump for an abrasive slurry comprising:
   a unitary pump housing;
   at least one inlet means and one outlet means for each stage of said pump said inlet means and outlet means being located through the periphery of said pump housing and substantially transverse to the axis of said pump;

two end plates detachably connected to said pump housing for enhancing on-line maintenance of said pump;

a pump shaft axially located between and supported by said end plates;

a pair of face-to-face impellers, one impeller for each of said stages and coaxially located on said pump shaft for increasing pressure of an abrasive slurry passing therethrough;

means for circumferentially directing fluid flow within each stage wherein said means is located along the interior wall of each stage of said pump housing for turning fluid flow in the direction of impeller rotation and reducing inlet relative velocity at the impeller inlet and primarily at the impeller inlet tip diameter, said means comprising prerotator vanes located along the interior wall of said pump;

a wall in said housing disposed about the periphery of each of said impellers defining a vaneless radial diffuser means to receive the output of abrasive slurry from said impellers and reduce its velocity a sufficient amount to inhibit abrasive erosion of downstream surfaces, each of said diffuser means comprising replaceable abrasive-resistant inserts which form an inner surface of said diffuser means which is exposed to the abrasive slurry;

an arcuate fold-over volute extending substantially continuously about the periphery of each of said walls defining said diffuser means;

a cutwater formed from a material more abrasive-resistant than that of said housing and being interposed in an opening in each of the walls between each diffuser means and each volute for directing abrasive slurry from said diffuser means tangentially into said volutes; and means for sealing and supporting said pump shaft wherein said sealing and supporting means is coaxially positioned along said pump shaft and interposed each impeller and its respective end plate for preventing fluid leakage and providing bearing means for said shaft.

4. The centrifugal pump of claim 3 wherein said pump has a first inlet means and outlet means for the first stage of said pump, and a second inlet means and outlet means for the second stage of said pump.

5. The centrifugal pump of claim 4 wherein said pump further comprises an external cross-over for connecting said first outlet means to said second inlet means thereby connecting said pump stages in series.

6. The centrifugal pump of claim 4 wherein said first and second inlet and outlet means are connected in parallel.

7. The centrifugal pump of claim 3 wherein said outlet means is a frustoconical diffuser.

8. The centrifugal pump of claim 3 wherein said prerotator vanes are integrally located along the interior wall of said pump housing.

9. The centrifugal pump of claim 3 wherein said prerotator vanes are removably located along the interior wall of said pump housing.

10. The centrifugal pump of claim 1 wherein said pump further comprises an inlet volute for reducing inlet relative velocity at the inlet tip diameter.

11. The centrifugal pump of claim 1 wherein an interstage seal is coaxially interposed along said pump shaft between said impellers.

12. The centrifugal pump of claim 11 wherein said interstage seal comprises two opposed seals coaxially interposed along said pump shaft between said impellers.

13. The centrifugal pump of claim 3 wherein said diffuser means is replaceable.

14. The centrifugal pump of claim 13 wherein said diffuser means comprises two interlocking parallel walls, in line with said impeller discharge.

15. The centrifugal pump of claim 13 wherein said diffuser means interlocks with said pump housing.

16. The centrifugal pump of claim 3 wherein said volute is replaceable.

17. The centrifugal pump of claim 16 wherein said volute is interlocking within said centrifugal pump.

18. The centrifugal pump of claim 3 wherein said cutwater is replaceable.

19. The centrifugal pump of claim 3 wherein said means for sealing said pump shaft comprises a high-pressure, self-centering fluid seal.

20. The two-stage centrifugal pump of claim 3 wherein said pump is run in reverse as a let-down turbine.

* * * * *